United States Patent [19]

Waldeck

[11] 4,377,272

[45] Mar. 22, 1983

[54] AIRFOIL STAGNATION POINT MOLD

[75] Inventor: Thomas A. Waldeck, Wichita, Kans.

[73] Assignee: The Boeing Company, Seattle, Wash.

[21] Appl. No.: 343,539

[22] Filed: Jan. 28, 1982

[51] Int. Cl.³ ............................................. B29C 1/00
[52] U.S. Cl. .................................................. 249/160
[58] Field of Search .................... 249/83, 95, 96, 97, 249/160, 163, 164, 170; 204/45.3, 46.6, 221, 257, 317, 162; 425/126 R, 127, 128, 129 R, 567, DIG. 47, 383, 396, 406

[56] References Cited

U.S. PATENT DOCUMENTS

| | | | |
|---|---|---|---|
| 2,938,293 | 5/1960 | Richardson | 249/95 X |
| 3,008,859 | 11/1961 | Sinack | 264/317 X |
| 3,185,605 | 5/1965 | Osborne et al. | 264/257 X |
| 3,392,226 | 7/1968 | McKinoen | 425/DIG. 47 |
| 3,456,301 | 7/1969 | Morroni | 425/567 |
| 3,490,099 | 1/1970 | Smith et al. | 18/DIG. 47 |
| 3,669,589 | 6/1972 | Bordat | 425/129 X |
| 4,284,399 | 8/1981 | Newcomb et al. | 249/160 X |
| 4,295,629 | 10/1981 | Williams | 249/160 |
| 4,335,182 | 6/1982 | Brand et al. | 264/162 |

*Primary Examiner*—J. Howard Flint, Jr.
*Attorney, Agent, or Firm*—Edwin H. Crabtree

[57] ABSTRACT

A two part airfoil stagnation point mold which when the airfoil is formed therein and the two molds are separated, the residue or seam formed along the leading edge of the airfoil is positioned in a less sensitive stagnation area of the airfoil and the efficiency of the airfoil is thereby improved.

4 Claims, 6 Drawing Figures

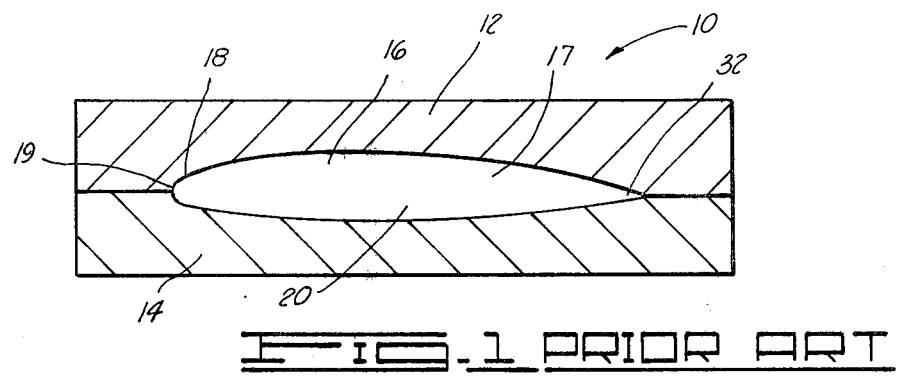
FIG. 1 PRIOR ART
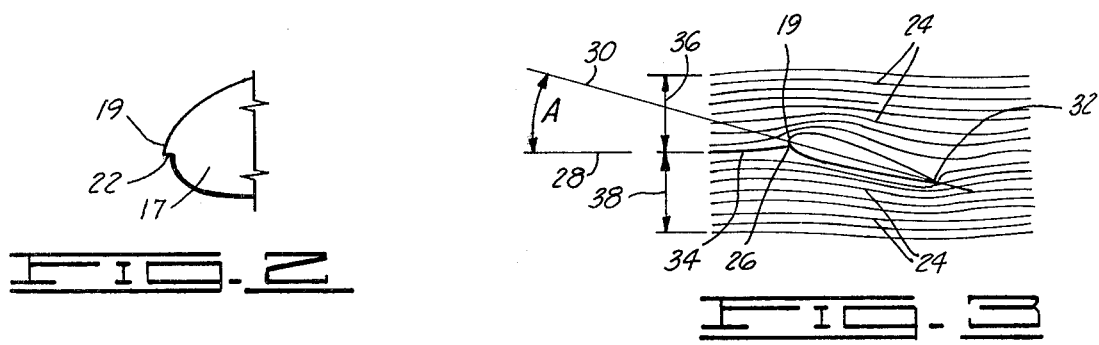
FIG. 2
FIG. 3
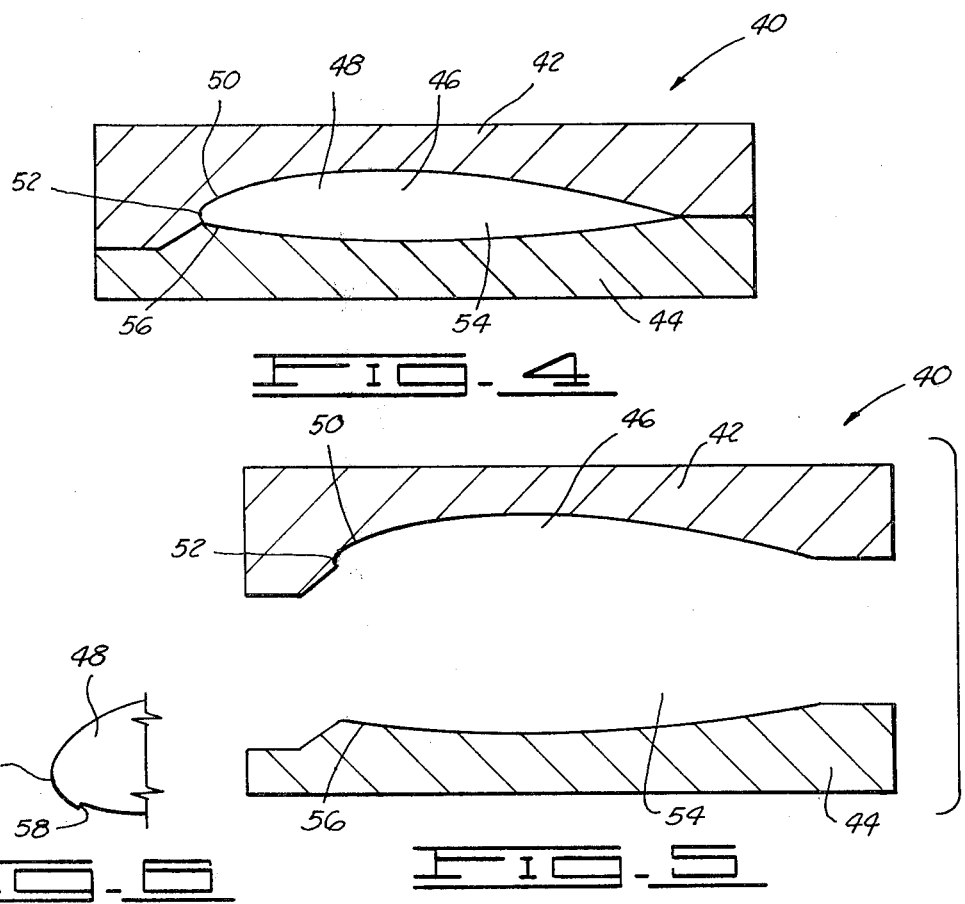
FIG. 4
FIG. 6
FIG. 5

AIRFOIL STAGNATION POINT MOLD

BACKGROUND OF THE INVENTION

This invention relates to a mold for forming an airfoil and more particularly but not by way of limitation to a two part airfoil stagnation point mold which is designed when separated to form a residue or seam line in an area less sensitive than the airfoil leading edge.

Current mold designs for making airfoil parts separate into two halves at the leading edge and at the trailing edge of the airfoil. The molds are separated to remove the airfoil part. In molding the airfoil shape in this manner, a residue or seam line is formed on the leading edge of the airfoil. This imperfection causes a flow change or disturbance which reduces the efficiency of the airfoil. A rework procedure of either filling in or removing the airfoil material is undertaken to correct the defective airfoil parts. This rework results in alternating the critical airfoil leading edge geometry and consequently its efficiency.

Heretofore in U.S. Pat. No. 2,408,788 to Ludington et al, U.S. Pat. No. 2,451,131 to Vidall et al, U.S. Pat. No. 3,301,927 to Exley et al and U.S. Pat. No. 3,962,506 to Dunahoo various types of airfoils and methods of making airfoils and re-enforced structure dealing with airfoils are shown and disclosed in these patents. None of the prior art patents address the problem of having a residue or a seam line formed in the leading edge of an airfoil from a two part mold and eliminating the problem of the residue or seam formed therein and causing air flow disturbance at this critical point thereby reducing the efficiency of the airfoil.

SUMMARY OF THE INVENTION

The subject invention is a two part airfoil mold design that separates at a selected stagnation point on the airfoil. The sensitive geometry of the airfoil's leading edge is maintained. Further the stagnation point on the airfoil is at a point where the streamline separates and the air flows over the top of the airfoil on one side and underneath the other side of the stagnation point.

The mold is simple in design and eliminates the residue or a seam line along the length of the airfoil leading edge.

The airfoil stagnation point mold includes an upper half mold and a lower half mold contoured for forming an airfoil part therein. The two molds are designed to separate at the trailing edge of the airfoil part with the separation at the airfoil leading edge offset so the leading edge of the airfoil part is uninterrupted and any seam or residue left is offset in the less sensitive stagnation area in the front of the airfoil.

BRIEF DESCRIPTION OF THE DRAWINGS

FIG. 1 illustrates a cross section of the prior art upper and lower half molds for forming an airfoil part therein.

FIG. 2 is an enlarged side view showing the interrupted leading edge of the airfoil having a seam line along the length thereof.

FIG. 3 illustrates the air flow past the airfoil part.

FIG. 4 illustrates a cross section of a two part airfoil stagnation point mold.

FIG. 5 illustrates the two part point mold in a separated position.

FIG. 6 illustrates an enlarged side view of the front of the airfoil part with an uninterrupted leading edge contour.

DETAILED DESCRIPTION OF THE DRAWINGS

In FIG. 1 a cross section of a prior art airfoil part mold is illustrated and designated by general reference numeral 10. The mold 10 includes an upper half mold 12 and a lower half mold 14. The upper half mold 12 includes a cavity 16 which forms the upper half of an airfoil part 17. At the front sides 18 of the cavity 16 an airfoil leading edge 19 is formed.

The lower half mold 14 with a cavity 20 therein is indexed with the upper half mold 12 to form the lower portion of the airfoil part 17. The front sides of the lower half mold 14 at one end of the cavity 20 form the remaining portion of the leading edge 19 of airfoil part 20. It should be noted by reviewing FIG. 2 that when the upper half mold 12 and the lower half mold 14 are separated, a seam 22 is formed therein which causes an imperfection in the airfoil part 17 in the critical area of the leading edge 19 causing an air flow change or disturbance that reduces the efficiency of the airfoil part 17.

Heretofore, the seam 22 had to be filled or removed by hand to correct the imperfection and the rework resulted in altering the critical airfoil leading edge geometry.

In FIG. 3 the airfoil part 17 is shown wherein streamlines 24 pass over the top of the airfoil part 17 and therebelow with the airfoil part 17 having a stagnation point 26. If the airfoil part 17 is attached to an aircraft or the like and is in a horizontal flight mode, then line 28 represents a horizontal plane with line 30 representing a geometric chord plane. The plane 30 is drawn through the leading edge 19 and a trailing edge 32 of the airfoil part 17. The angle between the horizontal plane 28 and the chord plane 30 is known as the angle of the attack and represented by angle A.

Line 34 represents the stagnation streamline with arrow 36 indicating an area where the streamlines 24 pass over the top of the airfoil part 17. Arrow 38 indicates an area where the streamlines 24 pass under the airfoil part 17.

By definition the stagnation point 26 on the airfoil part 17 is a point where the streamlines 24 separate and the air flows over the top of the part 17 on one side and underneath on the other side. The air flow that flows over the top reaches its highest velocity in the vicinity of the leading edge 19 and therefore it is very sensitive to the exact shape of the airfoil part 17 in this region. The stagnation point 26 varies with the angle of attack A and is selected based on the intended use of the airfoil part 17. It can be appreciated that if the seam line 22 or residue left by the separation of the two molds 12 and 14 remain in the area of the airfoil leading edge 19 disturbance is introduced in this area and the efficiency of the airfoil part 17 is therefore greatly reduced.

In FIG. 4 the two part airfoil stagnation point mold is shown and illustrated in cross section and designated by general reference numeral 40. The mold 40 includes an upper half mold 42 and a lower half mold 44. The upper half mold 42 includes a cavity 46 which forms the upper half of an airfoil part 48. At front sides 50 of the mold 42 at one end of the cavity 46 a continuous contoured shape forming an uninterrupted leading edge 52 of the part 48 is formed.

The lower half mold 44 with a cavity 54 therein is indexed with the upper half mold 42 to form the lower portion of the part 48. At front sides 56 of the mold 44 at one end of the cavity 54 the remaining portion of the front of airfoil part 48 is formed but the sides 56 are in an area of the stagnation point 26 as shown in FIG. 3. Therefore, when the molds 42 and 44 are separated as in FIG. 5 the front of the airfoil part 48 appears as shown in FIG. 6.

In FIG. 6 an enlarged view of the front of the airfoil part 48 is shown with a seam 58 formed therein but unlike seam 22, the seam 58 is offset in an area of the stagnation point 26 so that this imperfection is no longer in the critical area of the leading edge 52 and therefore there is no air flow change or disturbance reducing the efficiency of the airfoil part 48. The seam 58 may be filled or removed only if desired and any rework will not critically effect the leading edge geometry.

Changes may be made in the construction and arrangement of the parts or elements of the embodiments as described herein without departing from the spirit or scope of the invention defined in the following claims.

What is claimed is:

1. A two part airfoil mold for forming an airfoil part therein, the mold comprising:
    a first half mold, a portion of the first half mold having a cavity therein for forming one half of the airfoil part, the front sides of the mold at one end of the cavity having a continuous contoured shape forming an uninterrupted leading edge of the airfoil part, the rear sides of the mold at the other end of the cavity forming a portion of the trailing edge of the airfoil part; and
    a second half mold, the second half mold indexed with the first half mold with a portion of the second half mold having a cavity therein for forming the other half of the airfoil part, the front sides of the mold at one end of the cavity formed in an area of the typical stagnation point of the airfoil, the rear sides of the mold at one end of the cavity forming the remaining portion of the trailing edge of the airfoil part.

2. The mold as described in claim 1 wherein the first half mold is an upper half mold, the lower portion of the upper half mold having the cavity therein for forming the upper half of the airfoil part.

3. The mold as described in claim 2 wherein the second half mold is a lower half mold, the lower half mold indexed with the upper half mold for forming the airfoil part therein, the upper portion of the lower half mold having the cavity therein for forming the lower half of the airfoil part.

4. A two part airfoil mold for forming an airfoil part therein, the mold comprising:
    an upper half mold, the lower portion of the upper half mold having a cavity therein for forming the upper half of the airfoil part, the front sides of the mold at one end of the cavity having a continuous contoured shape forming an uninterrupted leading edge of the airfoil part, the rear sides of the mold at the other end of the cavity forming a portion of the trailing edge of the airfoil part; and
    a lower half mold, the lower half mold indexed with the upper half mold for forming the airfoil part therein, the upper portion of the lower half mold having a cavity therein for forming the lower half of the airfoil part, the front sides of the mold at one end of the cavity formed in an area of the typical stagnation point of the airfoil part, the rear sides of the lower half mold at the other end of the cavity forming the remaining portion of the trailing edge of the airfoil part.

* * * * *